March 1, 1966 W. H. DU BOIS 3,237,731
DISC BRAKE ROTOR CONSTRUCTION
Filed Jan. 23, 1964 3 Sheets-Sheet 1

INVENTOR.
WILLIAM H. DuBOIS
BY
William S. Thompson
ATTORNEY

INVENTOR.
WILLIAM H. DuBOIS

INVENTOR.
WILLIAM H. DuBOIS
BY
William S Thompson
ATTORNEY

United States Patent Office 3,237,731
Patented Mar. 1, 1966

3,237,731
DISC BRAKE ROTOR CONSTRUCTION
William H. Du Bois, South Bend, Ind., assignor to The Bendix Corporation, South Bend, Ind., a corporation of Delaware
Filed Jan. 23, 1964, Ser. No. 339,756
7 Claims. (Cl. 188—218)

The present invention relates to a disc brake rotor construction and more particularly a rotor construction of the segmented type having connecting means that permits free thermal expansion of the segments while permitting free axial movement of the rotor during brake engagement.

In my prior U.S. Patent 2,423,881 there is shown and disclosed a disc brake having a segmented annular disc element adapted to permit individual thermal expansion of the disc segments without interference between adjacent segments. The present invention resides in providing an improved means for interconnecting the segments which is low in cost, facilitates assembly and permits free axial displacement of the disc element during braking applications.

Accordingly it is an object of the present invention to provide improved connecting means for the segments of a brake disc.

It is another object of the present invention to provide rotor brake disc segment connecting means comprised of a low cost continuous ring and rivet connection which permits free thermal expansion of the segments while restraining radial displacement of the segments due to centrifugal forces thereby permitting free axial movement.

Other objects and advantages of the invention will be apparent with reference to the description and accompanying drawings wherein.

Figure 1:
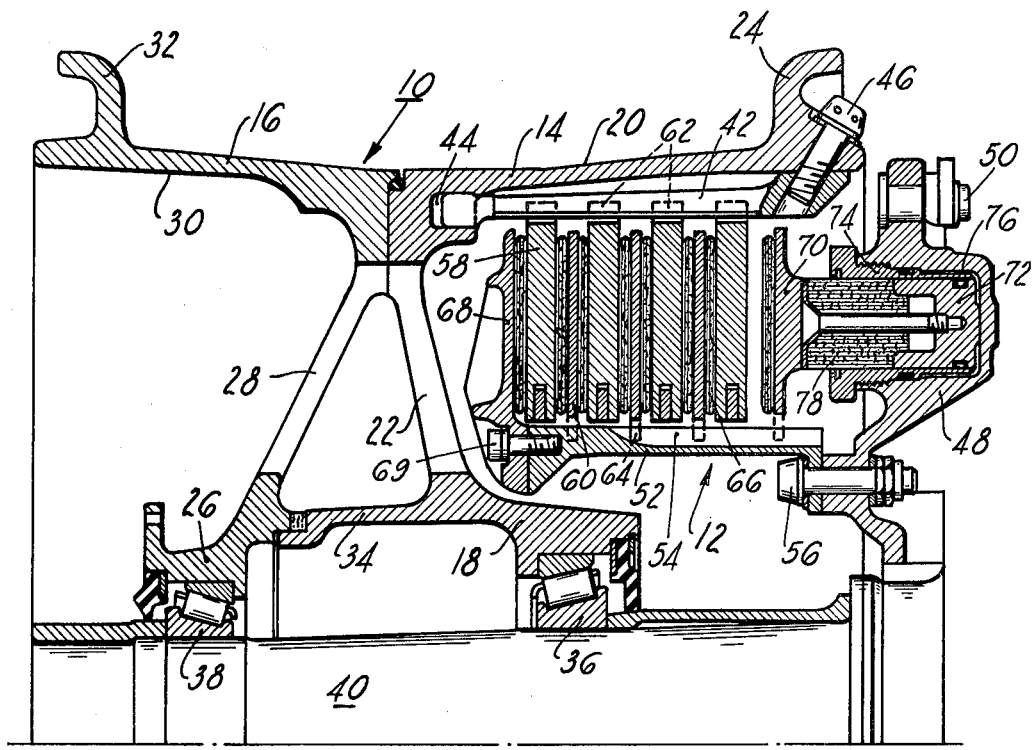
FIGURE 1 is a cross sectional view of a brake and wheel half including rotor segments embodying the principles of the present invention.

Referring first to the wheel and brake arrangement shown in FIGURE 1, the wheel is designated generally by the reference numeral 10 whereas the brake is generally designated by numeral 12. The wheel 10 is comprised of two wheel segments or halves 14 and 16 which are joined together to form a wheel by bolts, not shown. The wheel segment 14 is comprised of a hub portion 18, a rim portion 20, and a sloped wheel side 22 interconnecting hub and rim segments. Additionally, at the outer extremity of rim 20 there is provided a tire retaining flange 24. Wheel segment 16 is comprised of similar elements having a hub 26, connecting side 28, rim 30 and tire flange 32. A cylindrical strengthening extension 34 extends between hub segments. The hub segments are mounted on bearings 36, 38 which are in turn supported by axle 40.

Wheel segment 14 includes a plurality of rotor drive keys arranged about the internal circumference of rim 20, only one of said drive keys is shown and is designated by numeral 42. The rotor drive key is secured on one end by a slot 44 formed at the juncture between rim and wheel side and is fastened at its other end by screw 46 inserted through the flange 24.

The disc brake assembly 12 is comprised of a fixed carrier housing 48 adapted to be fastened to a non-rotating part by the connecting means partially illustrated and designated by numeral 50. A splined sleeve member 52 having splines 54 is fixedly secured to carrier housing 48 by bolts, one of which is designated by numeral 56. A plurality of annular brake rotor discs 58 and stator discs 60 are alternately arranged in the annular brake space defined between sleeve member 52 and wheel rim portion 20. Rotor discs 58 have slots 62 formed in the outer radial edge or periphery engageable with the drive keys 42 so that the rotor segments are axially movable and rotatable with the wheel 10. Stator discs 60 have similar slots 64 formed in their inner radial edge or periphery and engageable with the splines 54 formed on fixed sleeve 52 so that the stator segments are axially movable, but fixed rotationally. Each stator disc has friction lining material 66 secured to opposite sides which is preferably, but not necessarily, of the inorganic sintered metal type.

A fixed reaction or backing plate member 68 is secured to the end of fixed sleeve 52 by screws, one of which is designated by numeral 69. The backing plate is generally of annular shape and encloses one end of the stack of rotor and stator discs and includes lining material 66 on the side facing the end rotor segment 58.

The other end of the stack of brake discs is enclosed by an axially movable pressure plate member 70 which is splined to sleeve 52 similar to the stator disc so as to be movable in an axial direction, but fixed rotationally. Friction material 66 is secured to the pressure plate side facing the end rotor disc.

A brake actuating piston member 72 is slidably mounted in piston liner 74 which is disposed in an opening 76 formed in the carrier 48. A plurality of such pistons may be annularly arranged around the brake to provide an evenly distributed actuating force to pressure plate 70. Piston 72 includes a block of insulating material 78 at its end to inhibit the transfer of heat from the brake friction surfaces which might otherwise boil hydraulic brake actuating fluid.

Each of the rotor segments 58 are constructed in accordance with the specific teachings of the present invention and will be more fully described with reference to FIGURES 2–6.

A disc brake such as that described above provides a compact high capacity braking arrangement since it provides a large area of sliding friction surface contact for a given overall brake volume displacement. When brake actuating fluid is applied to piston 72 the piston moves pressure plate 70 into engagement with an end rotor disc, thus displacing the rotors and stators axially and bringing into compressive engagement all the friction surfaces between adjacent members. Energy dissipation occurs due to the sliding contact between friction material 66 and the adjacent face of the rotor disc 58. This energy is dissipated in the form of heat, a large portion of which is absorbed by the rotor discs 58 causing thermal expansion thereof, and if not segmented, the rotors will buckle or warp or possibly break which reduces or destroys brake effectiveness.

Figure 2:
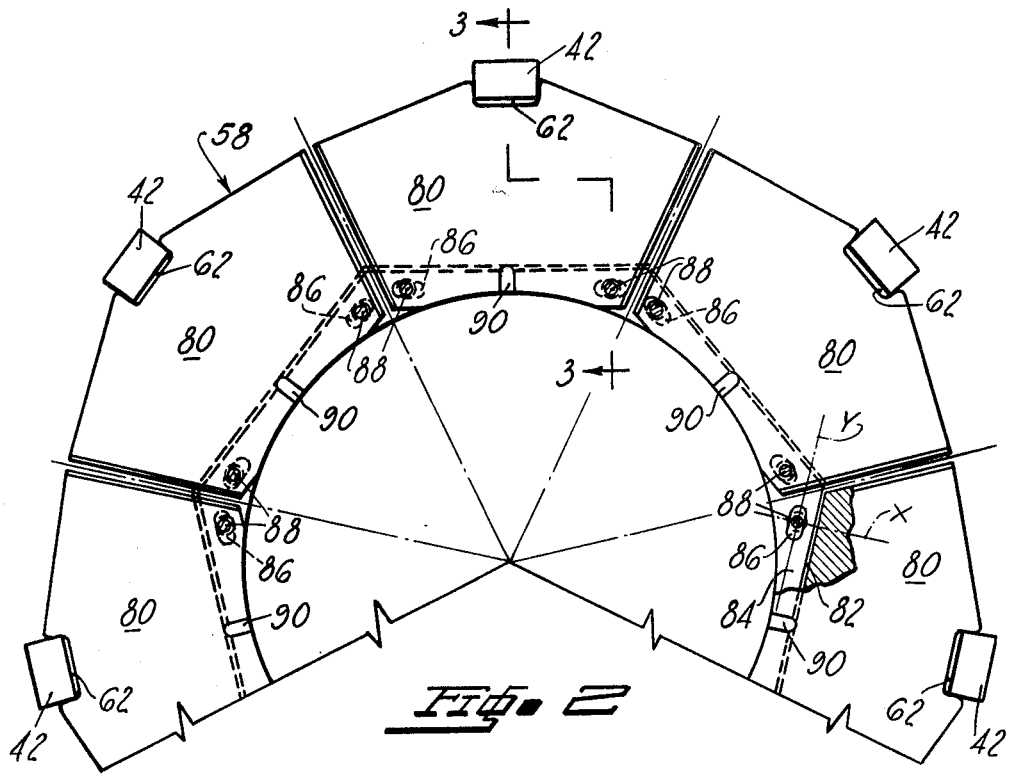
FIGURE 2 is a plan view of a major portion of a rotor showing a first embodiment of my invention with a connecting ring disposed at the inside diameter of the disc segments.
Figure 3:
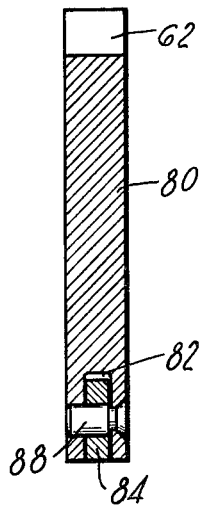
FIGURE 3 is a section view taken along section line 3—3 of FIGURE 2 showing a rivet connection between ring and segments of my first embodiment.

Referring now to FIGURES 2 and 3 there is shown a first embodiment of the rotor disc 58 of such design to withstand the severe thermal applied stresses. Each rotor disc 58 is comprised of a plurality of separate generally arcuate or trapezoidal shaped segments 80 which are disposed a spaced distance from one another sufficiently to allow for thermal expansion and comprise collectively an annular shaped rotor disc. Each segment 80 has a slot 62 formed in its outer radial edge which is engageable with a complementary drive key 42, illustrated in FIGURE 1. Each segment has a flat sided retaining groove or slot 82 extending into the segment from its inner radial edge and traversing the width of the segment.

A continuous connecting ring 84 of generally annular shape having a polygonal outer periphery and circular inside diameter has one of the segments 80 inserted over each of the flats on the outer periphery so that ring 84 projects into the slots 82 as best shown in FIGURE 3. Thte ring 84 is flat sided and has a width only slightly less than that of slot 82 to maintain close axial alignment of the segments to avoid catching on the friction material 66. The ring 84 has a number of elongated slots 86, two for each segment 80. A rivet 88 is provided for each slot 86 and is fixedly held by the segment passing through the slot.

Each of the elongated slots 86 has a small and a large dimension, illustrated in FIGURE 2, measured along an X and a Y axis respectively. The X axis is generally parallel to a radial line passing through the drive key slot 62 of the associated segment 80 and the imaginary center of the rotor disc. The small slot dimension taken along the X axis is only slightly greater than the diameter of the rivet 88 so that the segments are restrained from moving radially outwardly towards its associated drive key 42 under influence of centrifugal action of the rotating wheel. Thus the drive key slots 62 will only contact the drive key 42 at its sides and the rotor will thereby be free to move in an axial direction regardless of wheel rotation.

The larger dimension of slot 86 taken along the Y axis is generally normal to the X axis and permits the rivet to move freely in a direction perpendicular to the radial line through the rotor drive connection. Thus each segment is free to expand across the segment width. The clearance between the bottom of drive key slot 62 and the drive key 42 permits thermal expansion of the segment in a radial direction.

The ring 84 and rivet and slot connection locate each segment 80 a spaced distance from its adjacent segment so that the segments when expanding do not interfere with each other.

A stress relieving slot 90 is formed in the segments 80 along the segment centerline at its inner edge.

The construction of ring 84 provides a continuous ring having a relatively small thickness compared to the overall rotor structure. Thus the ring stiffness in an axial direction is small. To the extent heat tends to warp the connecting ring 84, its axial flexibility permits it to be readily deflected by brake application force and thus flattened during brake engagements.

Figure 4:
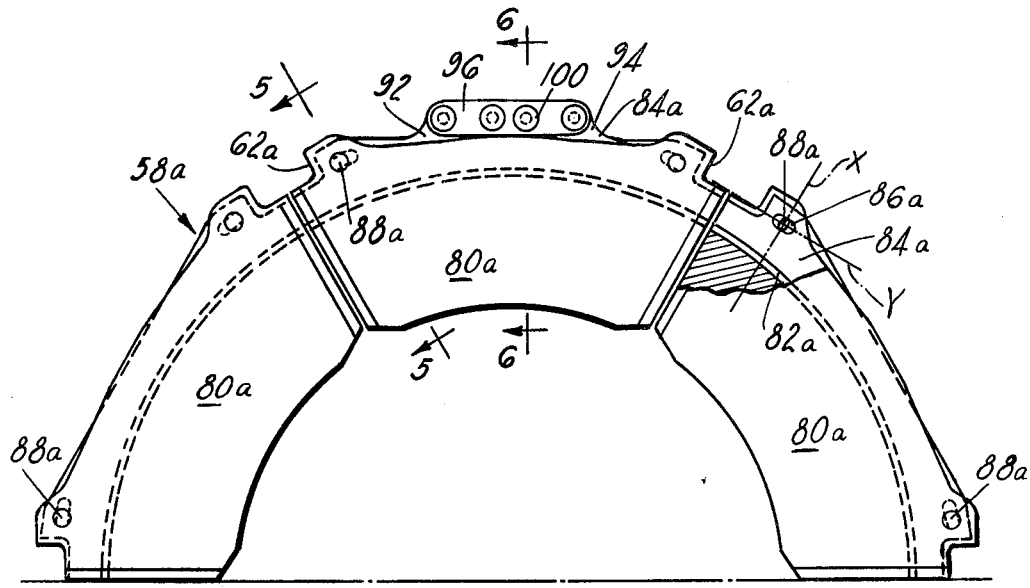
FIGURE 4 is a plan view of a rotor half showing a second embodiment of my invention with a connecting ring disposed at the outside diameter of the disc segments.
Figure 5:
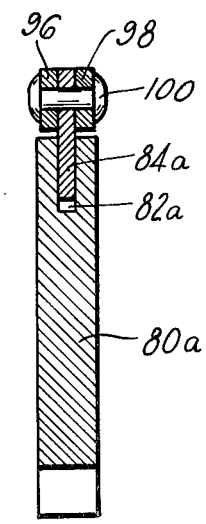
FIGURE 5 is a section view taken along section line 5—5 of FIGURE 4 showing the rivet connection between ring and segments of my second embodiment.
Figure 6:
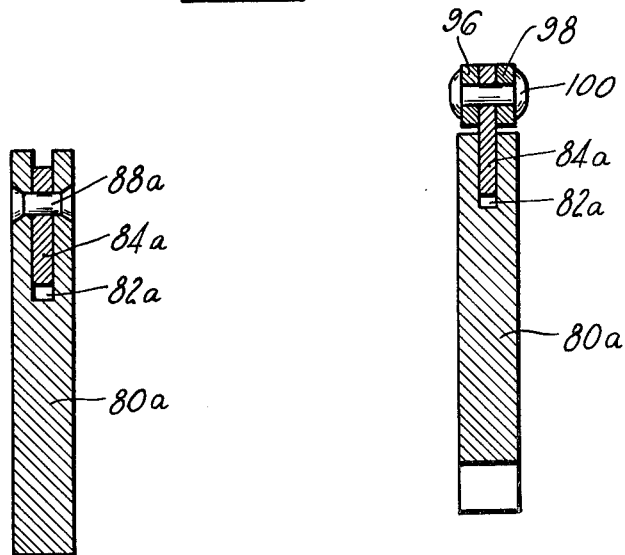
FIGURE 6 is a section view taken along section line 6—6 of FIGURE 5 showing a ring half connecting rivet connection.

Referring now to FIGURES 4–6 there is shown a second embodiment of my rotor construction wherein the segment connecting ring is provided at the outside diameter of the segments. The FIGURE 2 and 3 species is designated as an internal ring segmented rotor construction whereas the FIGURE 4–6 species is designated as an external ring segmented rotor construction. In the description of the external ring embodiment, parts similar in form or function to those of the internal ring embodiment bear the same numerals with an added suffix a.

The external ring rotor disc is comprised of a plurality of arcuate segments 80a, each having a retaining groove or slot 82a formed in its outer edge. A continuous connecting ring 84a is fitted in the slots 82a. The ring and slot sides being substantially flat to maintain axial alignment of the individual segments. Elongated slots 86a are formed in the ring 84a and have a small dimension measured along an X axis and a larger dimension along a Y axis. The rotor drive key slot 62a in this embodiment is located at the edge of the segments 80a, one-half of the slot being formed in the edge of each adjacent segment. The X axis of slot 86a is substantially parallel with a radial line passing through slot 62a whereas the Y axis is generally normal to X axis. Rivet 88a is secured to the segment and passes through slot 86a. The diameter of rivet 88a very nearly equals the width dimension of slot 86a along the X axis thus preventing the segment from moving radially outwardly against the drive key by centrifugal action. The segments 80a are free to expand with temperature in both a circumferential and radial direction.

To permit assembly of the external ring rotor, the ring member 84a is formed from two semi-circular segments 92 and 94 each of which may be separately inserted into the slot 82a of the segments. The semi-circular ring segments are then connected by a pair of flat metal strips 96 and 98 which overlie the adjacent ends of segments 92 and 94. Rivets 100 then secure the strips to the ring segment ends to form a unitary continuous ring.

While the two embodiments described illustrate some of the variations within the scope of the present invention that may be made, it is apparent that other modifications may be made without departing from the scope of the present invention. For example certain reversals in the relationship of the parts may be readily made. While the rotor drive connection has been illustrated as a male drive key secured to the wheel rim and female slot on the rotor segments it is also common practice to form a male projection on the rotor discs and female slots on the wheel rim.

These and other variations may be made without departing from the scope of my invention and it is therefore my intention to be limited only by the terms of the appended claims.

I claim:

1. A brake friction rotor disc comprising: a plurality of separate generally arcuate segments annularly arranged and spaced sufficiently from one another to permit free individual expansion under the influence of heat, each of said segments having a radial inner and a radial outer edge, a groove formed in each segment along one of said radial inner and said radial outer edges to collectively define a generally circular retaining groove for said plurality of annularly arranged segments, a retaining ring disposed in said retaining groove operative to maintain axial alignment of said segments while permitting thermal expansion of the individual segments in circumferential and radial directions without interference, drive connecting means formed in each of said segments in said radial outer edge adapted to transmit a rotational torque to each of said segments, segments connecting means for each segment operative to connect each respective segment to said retaining ring while permitting radial and circumferential expansion of said segments.

2. A brake friction rotor disc as claimed in claim 1 wherein said retaining groove formed in one radial edge of said segments is formed in the inner radial edge.

3. A brake friction rotor disc as claimed in claim 1 wherein said retaining groove formed in one radial edge of said segments is formed in the outer radial edge.

4. A brake friction rotor disc comprising: a plurality of separate generally arcuate segments annularly arranged and spaced sufficiently from one another to permit free individual expansion under the influence of heat, each of said segments having a radial inner and a radial outer edge, a groove formed in each segment along one of said radial inner and said radial outer edges to collectively define a generally circular retaining groove for said plurality of annularly arranged segments, a retaining ring disposed in said retaining groove operative to maintain axial alignment of said segments while permitting thermal expansion of the individual segments in circumferential and radial directions without interference, drive connecting means formed in each of said segments in said radial outer edge adapted to transmit a rotational torque to each of said segments, rivet connecting means for each segment operative to connect each respective segment to said retaining ring, said rivet connecting means including a pair of rivets spaced along a line substantially normal to radial line passing through said drive connecting means of its associated segment thus permitting free thermal expansion in a radial direction on either side of said normal line while preventing said segments from moving radially outwardly in response to centrifugal forces, said rivet connecting means having lost motion along said normal line to permit free thermal expansion of the segments in a circumferential direction.

5. A brake friction rotor disc comprising: a plurality of separate generally arcuate segments annularly arranged and spaced sufficiently from one another to permit free individual expansion under the influence of heat, each of said segments having a radial inner and a radial outer edge, a groove formed in each segment along one of said radial inner and said radial outer edges to collectively define a generally circular retaining groove for said plurality of annularly arranged segments, a retaining ring disposed in said retaining groove operative to maintain axial alignment of said segments while permitting thermal expansion of the individual segments in circumferential and radial directions without interference, drive connecting means formed in each of said segments in said radial outer edge adapted to transmit a rotational torque to each of said segments, a pair of rivet and slot connecting means for each segment operative to connect each respective segment to said retaining ring, said slot portion of said rivet and slot connecting means having elongated shape providing a lost motion connection with its associated rivet along a first axis and a close positive connection with its associated rivet along a second axis, said slot portion oriented to align said first axis generally normal to a radial line passing through said drive connecting means of its associated segment and said second axis generally parallel to said radial line to provide free thermal expansion of the segments while preventing displacement due to centrifugal forces.

6. A brake friction rotor disc comprising: a plurality of separate generally arcuate segments annularly arranged and spaced sufficiently from one another to permit free individual expansion under the influence of heat, each of said segments having a radial inner and a radial outer edge, a groove formed in each segment along its radial inner edge to define a generally circular retaining groove for said plurality of annularly arranged segments, a retaining ring disposed in said retaining groove operative to maintain axial alignment of said segments while permitting thermal expansion of the individual segments in circumferential and radial directions without interference, drive connecting means formed in each of said segments in said radial outer edge adapted to transmit a rotational torque to each of said segments, a pair of rivet and slot connecting means for each segment operative to connect each respective segment to said retaining ring, said slot portion of said rivet and slot connecting means having elongated shape providing a lost motion connection with its associated rivet along a first axis and a close positive connection with its associated rivet along a second axis, said slot portion oriented to align said first axis generally normal to a radial line passing through said drive connecting means of its associated segment and said second axis generally parallel to said radial line to provide free thermal expansion of the segments while preventing displacement due to centrifugal forces.

7. A brake friction rotor disc comprising: a plurality of separate generally arcuate segments annularly arranged and spaced sufficiently from one another to permit free individual expansion under the influence of heat, each of said segments having a radial inner and a radial outer edge, a groove formed in each segment along its radial outer edge to define a generally circular retaining groove for said plurality of annularly arranged segments, a retaining ring disposed in said retaining groove operative to maintain axial alignment of said segments while permitting thermal expansion of the individual segments in circumferential and radial directions without interference, drive connecting means formed in each of said segments in said radial outer edge adapted to transmit a rotational torque to each of said segments, a pair of rivet and slot connecting means for each segment operative to connect each respective segment to said retaining ring, said slot portion of said rivet and slot connecting means having elongated shape providing a lost motion connection with its associated rivet along a first axis and a close positive connection with its associated rivet along a second axis, said slot portion oriented to align said first axis generally normal to a radial line passing through said drive connecting means of its associated segment and said second axis generally parallel to said radial line to provide free thermal expansion of the segments while preventing displacement due to centrifugal forces.

References Cited by the Examiner

UNITED STATES PATENTS

| | | | |
|---|---|---|---|
| 2,423,881 | 7/1947 | Du Bois | 188—218 X |
| 2,531,696 | 11/1950 | Martin | 188—218 X |
| 2,893,519 | 7/1959 | Martin | 188—218 X |
| 2,902,130 | 9/1959 | Halberg et al. | 192—68 X |

FOREIGN PATENTS 1,132,609　11/1956　France.

FERGUS S. MIDDLETON, *Primary Examiner.*

ARTHUR L. LA POINT, *Examiner.*